United States Patent [19]

Hauge

[11] Patent Number: 4,978,953
[45] Date of Patent: Dec. 18, 1990

[54] DEVICE FOR MONITORING MULTIPLE DIGITAL DATA CHANNELS

[75] Inventor: Douglas Hauge, Coon Rapids, Minn.

[73] Assignee: Technology 80, Inc.

[21] Appl. No.: 275,099

[22] Filed: Nov. 22, 1988

[51] Int. Cl.⁵ .................................. H04B 17/00
[52] U.S. Cl. ........................ 340/825.16; 340/825.03; 340/825.08; 340/825.52; 340/825.79; 370/13
[58] Field of Search ............... 370/90, 86, 89, 96, 370/13, 53, 95.1, 95.2, 85.7, 85.8, 91, 92; 340/825.03, 825.1, 825.13, 825.16, 825.52, 825.51, 825.11, 825.08, 825.79

[56] References Cited

U.S. PATENT DOCUMENTS

| | | | |
|---|---|---|---|
| 3,723,971 | 3/1973 | Betts et al. | 370/90 |
| 4,016,369 | 4/1977 | Pedersen | 340/825.52 |
| 4,763,122 | 8/1988 | Franaszek | 340/825.51 |

Primary Examiner—Donald J. Yusko
Assistant Examiner—Dervis Magistre

[57] ABSTRACT

A device for switching data channel signal lines of each of a number of data channels through modules having interconnection switching matrices, to a further device adapted to monitor the signal lines, including a module decoder for selective activation of each module, and series connections between the respective module decoders wherein a decoder may activate a module as a function of its series-connected position relative to other decoders.

7 Claims, 3 Drawing Sheets

DEVICE FOR MONITORING MULTIPLE DIGITAL DATA CHANNELS

FIELD OF THE INVENTION

This invention relates to a device for monitoring signals of multiple digital data channels, particularly directed to input/output channels typically associated with digital computer processing systems. The invention is related to the invention described in copending application Ser. No. 788,394, filed Oct. 17, 1985, now U.S. Pat. No. 4,773,003, and entitled "Apparatus for Monitoring and Analyzing Large Data Blocks on a Computer Channel."

BACKGROUND OF THE INVENTION

In the aforementioned copending patent application, owned by the assignee of the present invention, there is described a method and apparatus for passive coupling to individual signal lines on a computer data channel, and for monitoring the data passed thereover. The described apparatus is a channel analyzer system having logic circuits which have a preselectable capability for recognizing transmitted data of interest for further analysis. The channel analyzer system further includes a large storage area for retaining preselected amounts of data, and circuits for examining blocks of data so collected. The channel analyzer also includes circuits and software for labeling data samples with an identifier, displaying selected portions of the samples, including representative values signifying the data content and the content of data identified with preselected signal lines. The channel analyzer is capable of identifying preselected signal line changes, and monitoring the data channel activity prior to and subsequent to the occurrence of a preselected signal line event of interest.

The aforementioned channel analyzer system is capable of monitoring the considerable number of signal lines associated with a particular computer input/output channel. In a sense these channels accommodate information transfer in parallel flow arrangement, the total number of signal lines which may be simultaneously monitored is variable, depending upon the parallel data transfer capability, or word size, of a particular data processing system. It is not unusual for data processing systems to utilize channels having 35 or more parallel transmission paths. In the preferred embodiment of the channel analyzer described above the capability of connecting to and simultaneously monitoring 35 parallel lines is described.

A particular computer processing system may have a plurality of input and output channels, each channel having a predetermined number of parallel transmission paths, and it is desirable to provide the capability for the aforementioned channel analyzer to monitor more than a single channel. Multiple channel monitoring need not necessarily be simultaneously accomplished, but should be capable of accomplishment within a relatively short time frame. It is generally unsatisfactory to require all of the channel analyzer input conductors to be manually disconnected from a first computer channel and then manually reconnected to a second computer channel; this would require disconnecting more than 70 conductors from a first computer channel and then reconnecting the more than 70 input conductors to a second computer channel. It is preferable that all of the channel conductors to be monitored be initially connected during the time the channel analyzer is set up, when the monitored computer system or systems is shut down, and the conductors are left in place while the computer system or systems are operational. Manually disconnecting and reconnecting a large number of conductors is wasteful of computer time, and is usually not tolerable in an operational computer center environment.

There is therefore a need for a device which permits an initial hookup of all possible channel conductors for which monitoring is desired, and which may remain connected during operation of the computer system, without interference with any of the normal computer operational sequences.

In a typical computer center environment there may be a number of data processing systems operating simultaneously and independently of one another. Such systems are typically operated continuously, except for periodic set schedules for routine maintenance. Whenever a circuit failure occurs in any of these systems it is extremely important that the failure be isolated as soon as possible, so that repairs can be made with a minimum of lost time, to permit the system to resume operations as soon as possible. The channel analyzer described above is a valuable tool for assisting in the location and isolation of defective circuits, and it is therefore desirable to connect the channel analyzer to the input/output channels of a computer system which is experiencing circuit problems in order for the problem to be corrected. There is therefore a need for a connection device which will permit a rapid and efficient connection of the channel analyzer to the computer input/output channels, without disturbing the operation of other computer systems which may be operational at the same time. It is preferable to have the computer input/output channel connections made ahead of time, so that upon occurrence of a fault condition the channel analyzer can be immediately switched into a monitoring operation with respect to the various computer processor input/output channels, thereby minimizing maintenance delays.

SUMMARY OF THE INVENTION

The present invention is a device for enabling the monitoring of multiple computer data channels, by a channel analyzer or other like device, for operation repair and maintenance of computer processing systems. The invention includes a module having an interconnection matrix for connecting to four input/output channels, and selection logic to permit any one of the four channels to be selected for monitoring. In addition thereto, the invention includes circuits for coupling further modules to form an expanded interconnection matrix connected to a channel analyzer, wherein each of the further modules are uniquely identified to the channel analyzer without the need of any prewiring or switch identifiers. The invention remains totally passive with regard to the input/output channels to which it is connected, and it has no effect on the operation of the computer input/output channels under any condition of its operation.

It is a principal object of the present invention to provide an interconnection matrix for connecting to a plurality of signal lines of a computer data channel, and for connecting a plurality of data channels, to a signal analyzer device adapted for monitoring the electrical signals appearing on the data lines.

It is another object of the invention to provide an expandable interconnection matrix having a plurality of interconnection matrix modules which may be selectively coupled to a single signal analyzer device.

It is yet another object of the present invention to provide signal interconnection matrix modules for connection to a signal analyzer device, wherein each module may be selected by the analyzer device without requiring preset addressing adjustment.

BRIEF DESCRIPTION OF THE DRAWINGS

The foregoing and other advantages of the invention will become apparent from the following specification and claims, and with reference to the appended drawings, in which:

DESCRIPTION OF THE PREFERRED EMBODIMENT

Figure 1:
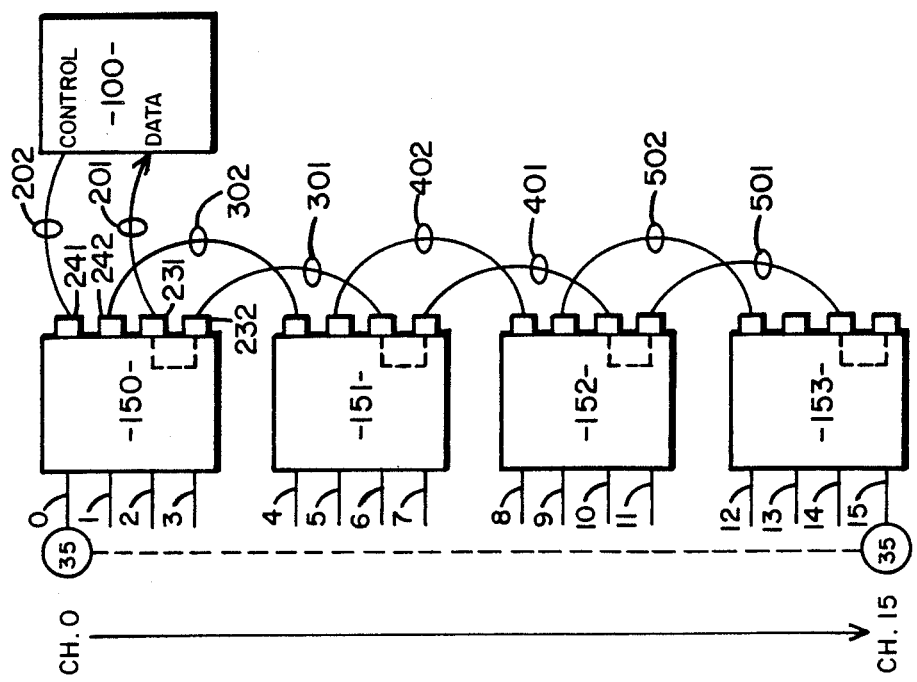
FIG. 1 shows a block diagram of an expanded interconnection matrix connected to a single signal analyzer device.

Referring first to FIG. 1, there is shown in block diagram form an expanded interconnection matrix which is connectable to 16 computer data channels, for monitoring signals on the signal lines of any of the 16 channels, and which is connected to a single signal analyzer device 100. The signal analyzer device 100 is preferably constructed according to the teachings of my copending patent application Ser. No. 788,394, filed Oct. 17, 1985, now U.S. Pat. No. 4,773,003, and entitled "Apparatus for Monitoring and Analyzing Large Data Blocks on a Computer Channel." The specification of this copending application is incorporated by reference herein, for its disclosure of the signal monitoring of a plurality of computer data channel lines. The device described in the foregoing specification is commercially available from the assignee of the present invention under the trademark "Channel Analyzer." The channel analyzer has provision for connection to 35 signal lines, for monitoring the electrical signals thereon, and has provision for generating an 8-bit output address signal. The output address signal is capable of selecting any one of up to 16 different computer data channels for monitoring, it being understood that each data channel may have up to 35 parallel data bits.

FIG. 1 shows a channel analyzer 100 having its "data" inputs connected to a first signal matrix module 150 via a cable 201. Cable 201 is connected to a connector 231 on module 150, and this connector is chained internally of module 150 to a further connector 232 which is further connected to cable 301. Cable 301 is likewise connected to module 151, and is chained to cable 401. Cable 401 is connected to module 152, and is chained to cable 501. Cable 501 is connected to module 153. Further and additional cables could be connected to further matrix interconnection modules in a similar fashion. This method of interconnecting modules is referred to as "chaining," wherein a continuous electrical contact may be made via interconnecting cables to a plurality of connection points. The electrical design concepts for chaining together a number of modules as shown in FIG. 1 is well known in the prior art. This design concept enables any of the interconnected matrix modules to transmit data to channel analyzer 100 via the series electrical connection made by the chained cables. The only requirement is for one matrix module to be activated and for the remaining matrix modules to be deactivated during the transmission of the data.

Channel analyzer 100 also is connected to interconnection matrix module 150 via cable 202, which in a preferred embodiment consists of an eight-wire conductor for transmitting electrical "control" signals representative of eight binary digits transmitted from channel analyzer 100. The eight-wire conductor of cable 202 is connected via cable connector 241 to logic circuitry within module 150, to be hereinafter explained, and is returned to a further cable connector 242 for connection to cable 302. Cable 302 is in turn connected to a control cable connector on module 151, and a return is made to a further connector which is connected to cable 402. Cable 402 is connected to a control cable connection on module 152, and a return is coupled to cable 502. Cable 502 is connected to module 153 in a similar fashion. Further and additional control cable connections could be made to further and additional interconnection matrix modules, in a manner similar to that described herein.

The data input to interconnection matrix module 150 comprises four different 35-conductor cables, designated 0, 1, 2, and 3, each cable associated with a particular computer data channel. For convenient reference, the four data channels connected as inputs to matrix module 150 are numbered channels 0, 1, 2, 3. The computer data channels may be four different channels on a single computer, or channels from different computers, or combinations thereof. The distal end of each of the 35-conductor cables has an electrical clamping means for coupling to an appropriate connection point in order to tap the appropriate computer data channel signal. Any of a number of well-known techniques may be utilized for making the electrical connection to the respective computer data channel signal lines, and a connection technique does not form a part of the present invention.

Interconnection matrix modules 151-153 each have respective cables which are connectable to a plurality of 35-conductor computer data channel signal lines, in any combination which is deemed appropriate and necessary for a particular monitoring situation. For convenience, these channels are sequentially numbered 4, 5, . . . 15. Therefore, the entire expanded interconnection matrix system illustrated on FIG. 1 is capable of connecting to 16 computer data channels, each data channel comprising up to 35 signal lines, and the signals from all of these lines may be selectively coupled into channel analyzer 100 for signal monitoring purposes. Of course, the particular number of cable conductors which may be used with the present invention is a matter of design choice, and any greater or lesser number of conductors may equally well be suited to the invention.

Figure 2:
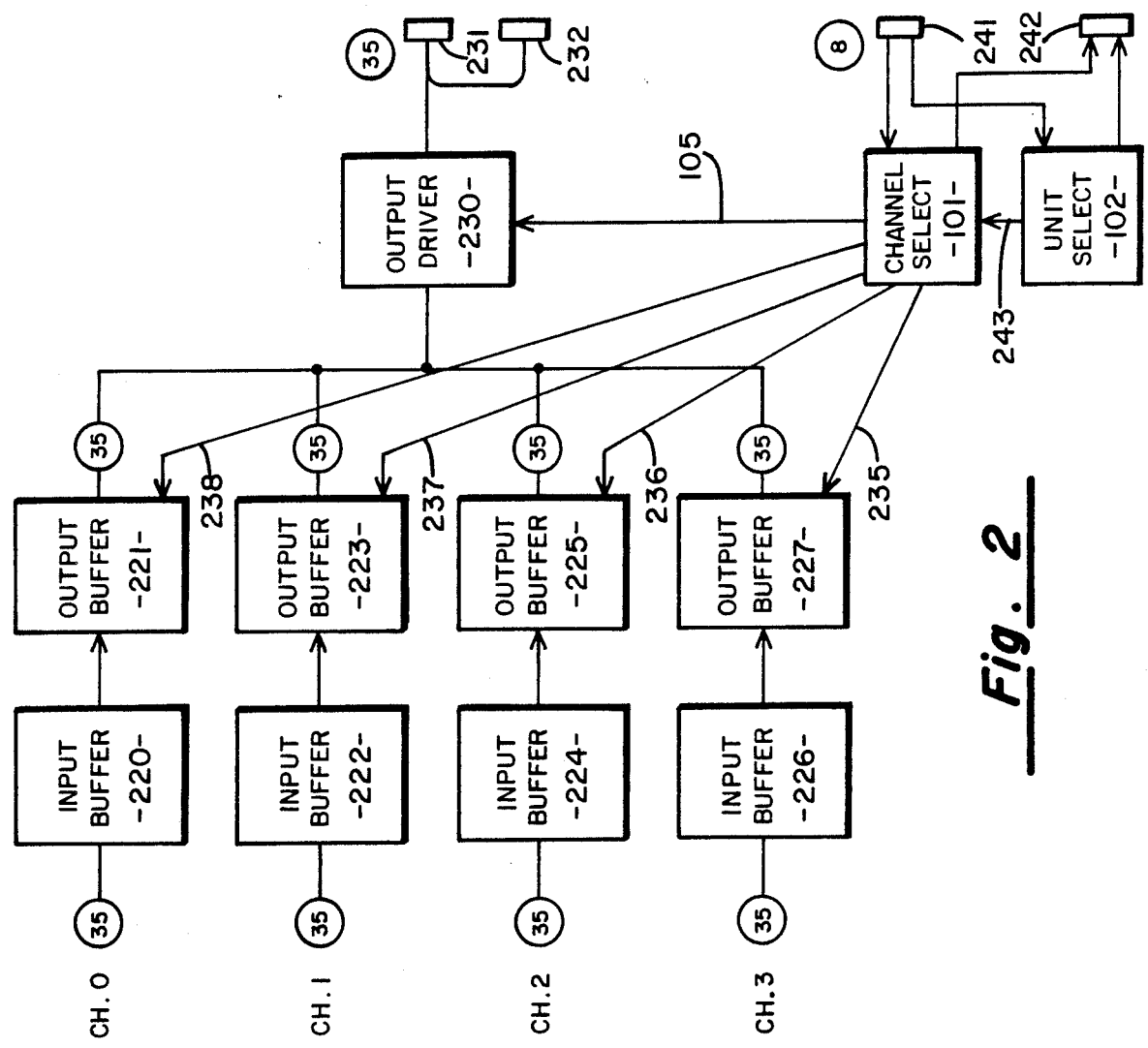
FIG. 2 shows a block diagram of a single module of an interconnection matrix device.

FIG. 2 shows a block diagram of a single interconnection matrix module, as for example module 150 as illustrated in FIG. 1. The interconnection matrix module contains four input buffers 220, 222, 224, and 226, each input buffer being connectable to a computer data channel cable comprising 35 input conductors. For convenience, the computer data channels have been labeled channel 0, 1, 2 and 3 as represented in FIG. 2. In all respects, the respective input buffers 220, 222, 224 and 226 are of identical construction, and are formed of identical semiconductor devices. An example of a commercially available semiconductor device which may be used for this purpose is type MC75129, manufactured by Motorola, Inc., Phoenix, Ariz.

Each of the input buffers are respectively coupled to an output buffer 221, 223, 225 and 227, which are themselves each of identical construction. The output buffers are likewise constructed from semiconductor devices. An example of a commercially available semiconductor device which may be used for this purpose is type 74HCT540, made by Motorola, Inc., Phoenix, Ariz.

The output connections of all of the output buffers 221, 223, 225, and 227 are merged together into a common set of output drivers 230. An example of a commercially available semiconductor device which may be used for this purpose is type MC3485, manufactured by Motorola, Inc., Phoenix, Ariz.

Output drivers 230 convey the 35 signal lines to cable connectors 231 and 232. Cable connector 231 may be connected to cable 201 for transmission of the data to channel analyzer 100. Cable connector 232 may be coupled to cable 301 for subsequent connection to another matrix module, as illustrated in FIG. 1.

The signal outputs from the output buffers is gated by "channel select" logic 101. For example, channel select 101 may generate a gating signal over line 235 to gate the data from output buffer 227 into output drivers 230. A gating signal from channel select logic 101 over line 236 will gate the data from output buffer 225 into output drivers 230; a gating signal from channel select logic 101 over line 237 will gate the data from output buffer 223 into output drivers 230; and a gating signal from channel select logic 101 over line 238 will gate the output buffers 221 into output drivers 230. An output "enable" signal over line 105 will activate the output drivers 230 to pass the data signals received at the output driver inputs to the output lines, terminating at cable connectors 231 and 232. Channel select logic 101 is controlled by signals which are received at cable connector 241, preferably consisting of eight signal input lines. Channel select logic 101 is designed to decode the bit pattern combination on two of the eight signal lines received at cable connector 241, in cooperation with "unit select" logic 102, which decodes the bit pattern combination on the remaining six of the Light signal lines received at cable connector 241. The unit select logic 102 determines whether the particular interconnection matrix module has been selected, and activates "output enable" line 105 when such a selection has been made. If unit select logic 102 and channel select logic 101 determine that none of the gating lines are to be activated the signals received at cable connector 241 are modified and sent out via cable connector 242 in a manner to be hereinafter described.

Figure 3:
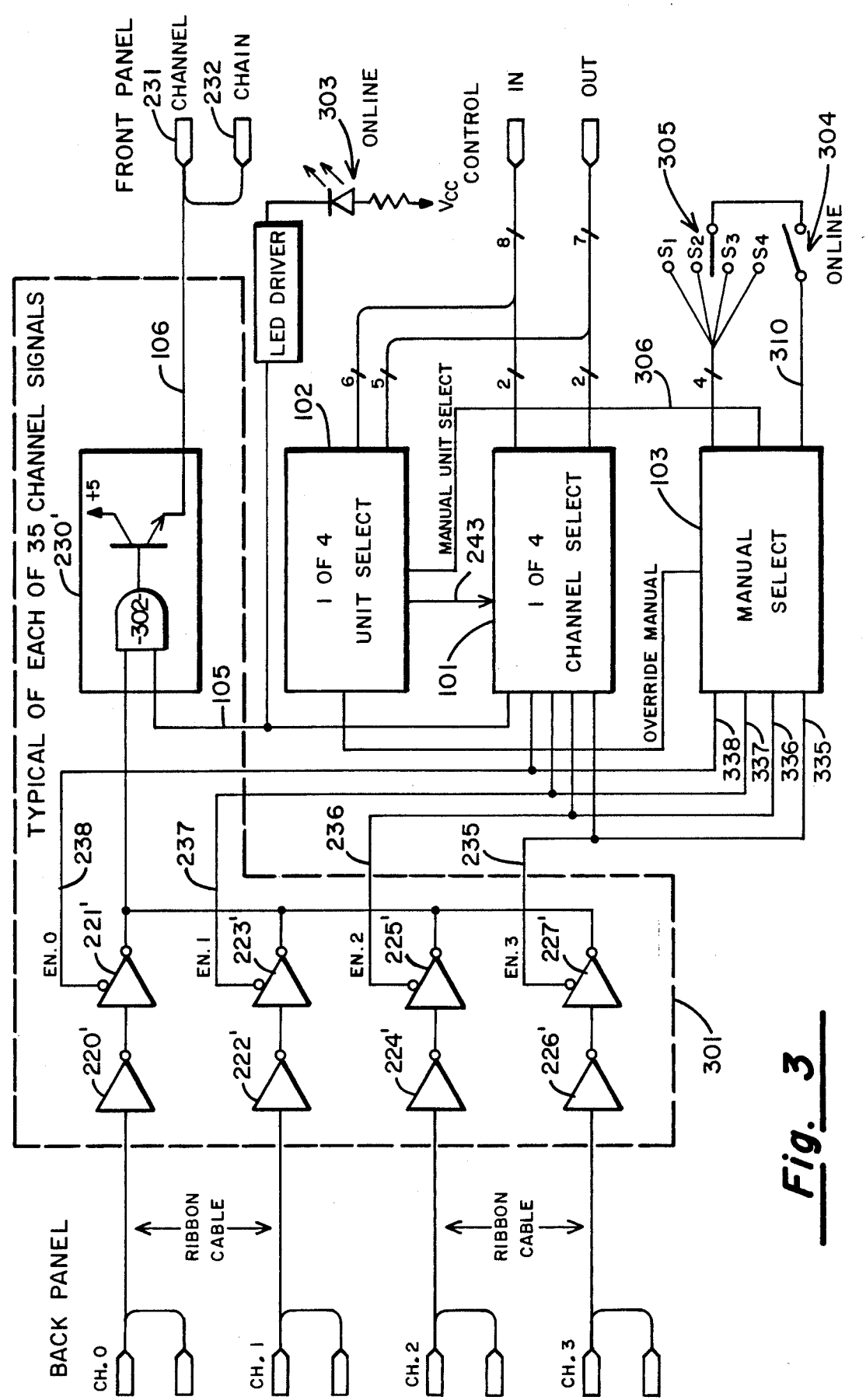
FIG. 3 shows a logic block diagram of an interconnection matrix module.

FIG. 3 shows a logic block diagram of an interconnection matrix module, including further details of the internal logic. The control signals from channel analyzer 100 are received at cable connector 241, consisting of eight signal lines. Six of these signal lines are coupled directly to unit select logic 102, and two of these signal lines are coupled directly to channel select logic 101. In practical operation, the eight signal lines received at cable connector 241 originate within channel analyzer 100 at an 8-bit output port, which transmits 8-bit binary signals under control of a microprocessor within channel analyzer 100. This 8-bit signal is counted down one binary count each time a new channel is to be selected, and the channel select logic 101 and unit select logic 102 utilize this binary count in determining which of a plurality of matrix modules are to be selected, and within each matrix module which of a plurality of channels are to be selected. To achieve the desired result, the lower 2-bit signals of the binary count received at cable connector 241 are coupled to channel select logic 101, and the upper 6-bit count signal is connected to unit select logic 102. Unit select logic 102 decodes the upper 6-bits of the binary count to determine whether the particular matrix module in which it resides has been selected. If it determines that it has been selected it activates line 243 to channel select logic 101 and channel select logic 101 activates line 105 to the output drivers. A signal on line 243 indicates selection of channel select logic 101, and channel select logic 101 then decodes the 2-bit count value it has received via cable connector 241 to determine which of the four channels within the matrix module is to be activated. As a result of this decoding, channel select logic 101 activates one of the four "enable" signals on lines 235, 236, 237 or 238. These enable signal lines are respectively connected to the output buffers, for which one signal channel line is represented in FIG. 3 in dotted outline 301. The representative channel line connection shown in dotted outline box 301 may, for example, be representative of bit number "0" of each of the four channels to which the matrix module is connected. An input buffer receiver 220' is connected to receive bit 0 of channel 0; and input buffer receiver 222' is connected to receive bit 0 of channel 1; an input buffer receiver 224' is connected to receive bit 0 of channel 2; and an input buffer receiver 226' is connected to receive bit 0 of channel 3. In a similar manner output buffer drivers 221', 223', 225', 227' are connected to the respective input buffer receivers, and are connected to a bit 0 output driver 230'. Output driver 230' consists of an AND gate 302 having as one of its inputs signals from all of the output driver circuits, and having as its other input a signal over line 105 from channel select logic 101. When signals are present over both AND gate inputs, the output driver circuit 230' generates an output signal over line 106 to cable connectors 231 and 232. This output signal is chained as has hereinbefore been described, ultimately to channel analyzer 100. Whenever a signal is present on line 105, channel select logic 101 also generates a signal to an LED driver to activate light-emitting diode 303, which is preferably located on the front panel of the matrix module, to thereby indicate that the matrix module has been selected, i.e., is "ONLINE."

A further feature of the invention is also illustrated in FIG. 3. A front panel of the matrix module has a manual switching arrangement 304 and 305 to permit manual activation of the matrix module. If switch 304 is placed in the "ONLINE" position the manual select logic 103 generates a signal over line 306 to activate unit select logic 102. This activation signal on line 306 causes activation of unit select logic 102, and depending upon which of the four positions of switch 305, one of the four channels will be selected via signals on lines 335, 336, 337 or 338. These signal lines are tied into the selection lines from channel select logic 101, to generate the same kind of "enable" signal as is generated by channel select logic 101.

Figure 4:
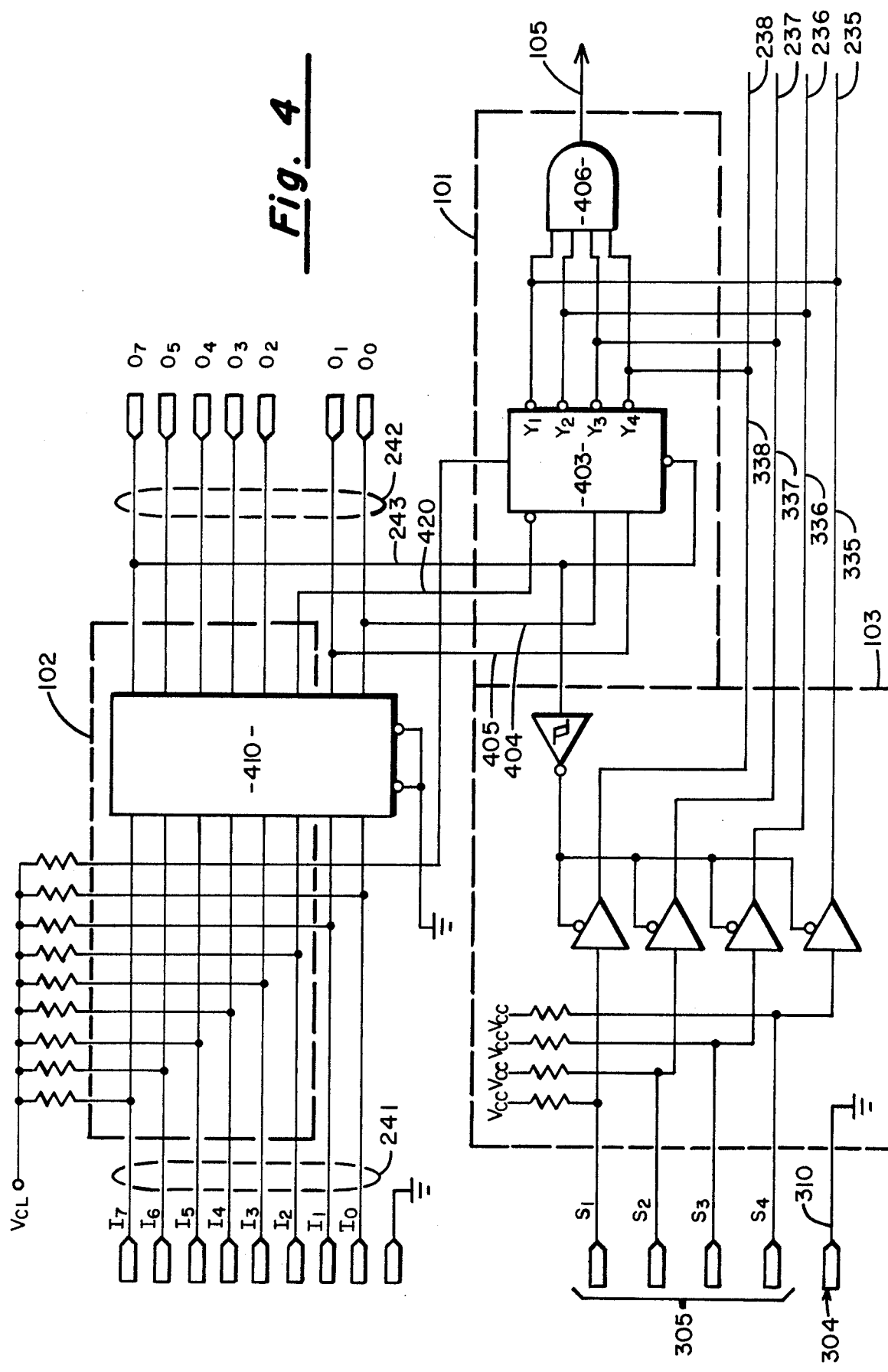
FIG. 4 shows a further logic diagram of the interconnection matrix module.

FIG. 4 shows a further logic diagram of an interconnection matrix module, as for example interconnection matrix module 150, illustrated in FIG. 1, and in further detail in FIGS. 2 and 3. The detailed logic of unit select logic 102 is illustrated, in the form of a semiconductor circuit 410. Semiconductor circuit 410 is a semiconductor chip which contains all of the logic functions for performing the operations to be hereinafter described. An example of a commercially available semiconductor device which may be used for this purpose is type 74HCT244, manufactured by Motorola, Inc. The eight signal lines which are received as an input at cable connector 241 are designated $I_0, I_1 \ldots I_7$, to indicate the respective bit positions of each of these cable conductors. These eight cable conductors are respectively wired into input connectors of circuit 410, and the output connectors of output circuit 410 are respectively wired to cable connector 242, wherein the corresponding bit positions are identified as $O_0, O_1 \ldots O_7$. However, the internal signal transmission paths within circuit 410 do not result in a one-for-one correspondence between the conductors identified on cable connector 241 to the cable conductors identified in cable connector 242. The following Table 1 illustrates the respective conductor connection paths through circuit 410:

TABLE 1

| Cable Connector 241 | Cable Connector 242 |
|---|---|
| $I_0$ | $O_0$ |
| $I_1$ | $O_1$ |
| $I_2$ | |
| $I_3$ | $O_2$ |
| $I_4$ | $O_3$ |
| $I_5$ | $O_4$ |
| $I_6$ | $O_5$ |
| $I_7$ | $O_7$ |

From the foregoing table it is apparent that there is no output conductor on cable connector 242 corresponding to input conductor $I_2$ on cable connector 241. It is also apparent that input conductor $I_3$ is coupled to output conductor $O_2$, input conductor $I_4$ is coupled to output conductor $O_3$, input conductor $I_5$ is coupled to output conductor $O_4$, input conductor $I_6$ is coupled to output conductor $O_5$, but input conductor $I_7$ is coupled to output conductor $O_7$. In other words, the second-most significant bit signal position ($I_6$), and the next subsequent three lesser bit signal positions ($I_5, I_4, I_3$) are each shifted one position to a lesser significant bit position at the output of unit select logic 102. The third bit position ($I_2$) is not passed to any output cable connector 242 bit position, but is rather coupled via line 420 to internal circuit 403 in channel select logic 101. The two lower order bit positions ($I_0, I_1$) are passed directly through unit select logic 102 to channel select logic 101, via lines 404 and 405. Lines 404 and 405 are also connected to circuit 403 within channel select logic 101. Circuit 403 is a decoder circuit for determining the signal combination on lines 404 and 405, and for activating one of four outputs $Y_1, Y_2, Y_3$, or $Y_4$, depending upon the signal combination at input lines 404 and 405. An example of a commercially available semiconductor device which may be used for this purpose is type 74HCT539, manufactured by Motorola, Inc., Phoenix, Ariz. The outputs $Y_1-Y_4$ are all coupled to gate 406, which generates a signal on line 105 whenever any one of the signals $Y_1-Y_4$ is present.

The signal lines from switch 305 are coupled into manual select logic 103, to generate a signal on one of lines 335–338, depending upon the selection position of switch 305. The output signal lines $Y_1-Y_4$ are connected to signal lines 335–338 respectively, to create the "enable" signals which are found on lines 235–238. As has hereinbefore been described, these "enable" signals, and each of them, control the gating of the respective input buffers in the interconnection matrix module.

All interconnection matrix modules 150–153 have internal logic wiring connections as illustrated in FIG. 4. Therefore, all interconnection matrix modules have an input cable connector 241 which is directly wired into a circuit such as circuit 410, and have an output cable connector 242 which is wired to circuit 410 in the identical manner as shown in FIG. 4. Therefore, in all cases, the two least significant bit positions ($I_0, I_1$) are passed through the logic circuit 410 from the input cable connector 241 to the output cable connector 242. The next most significant bit position ($I_2$) is not passed to an output cable connector, but is instead connected to the internal channel select logic 101, as an "enable" input to circuit 403. The next four most significant bit positions ($I_3, I_4, I_5, I_6$) are passed from cable connector 241 through the internal logic circuit 410 to an output bit position on cable connector 242 which is one less than the relative input bit position. Finally, the most significant bit position ($I_7$) is passed through the internal logic circuit 410 to the relative same bit position ($O_7$) in the output cable connector 242. In operation, this signal connection scheme enables the unit select logic in each interconnection matrix module to become position-dependent, even though all interconnection matrix modules are wired identically. In other words, the unit select logic 102 which is wired directly to the channel analyzer 100 will receive the same count value as is transmitted by the channel analyzer 100 over cable 202. This unit select logic will modify the count value as described herein, and will transmit, via cable 302, to the next subsequent interconnection matrix module a different count value from the count value it received. Each subsequent interconnection matrix module will modify its received count value accordingly, so that the number of times the count value is modified is a function of the number of interconnection matrix modules through which the count value is chained.

The sequence of 8-bit binary count values which is transmitted by channel analyzer 100 is preferably predetermined. There are a total of 16 count values transmitted by channel analyzer 100, preferably in the sequence shown in the following table, which also shows the corresponding interconnection matrix module and channel number which becomes selected by each count value in the sequence. The column entitled "Actual Channel No." corresponds to the actual input channel number shown in FIG. 1, numbered from 0–15, which is representative of the 16 computer data channels which may be monitored by the system.

TABLE 2

| Hexadecimal Channel Analyzer Count Value | Matrix Module Unit Selected | Matrix Module Channel Selected | Actual Channel Number |
|---|---|---|---|
| 84H–87H | 0 | 0–3 | 0–3 |
| 88H–8BH | 1 | 0–3 | 4–7 |
| 90H–93H | 2 | 0–3 | 8–11 |
| A0H–A3H | 3 | 0–3 | 12–15 |

Because the binary count value which is generated by channel analyzer 100, and transmitted out over cable 202, is sequentially modified by each of the interconnected matrix modules, the binary digits of the count value which have significance in activating the respective matrix modules are position dependent. That is, particular binary digits in the 8-bit binary count value may cause a matrix module to become activated if it becomes cabled into a first chain position, but not if it becomes cabled into a second chain position. From the foregoing description, it is apparent that input binary bits $I_0$, $I_1$ in any matrix module determine which of the four channels, if any, are to be activated: input bit $I_2$ is examined to determine whether the matrix module itself is to be activated, i.e., whether the "unit select" logic 102 will permit activation of the selected channel.

If the eight binary bit count value which is transmitted from channel analyzer 100 is designated $0_0$, $0_1$, $0_2$ . . . $0_7$, Table 3 illustrates the position dependency of the respective interconnection matrix modules, according to the wiring diagram shown in FIG. 1. FIG. 1 shows that the sequence of chaining interconnection of the matrix modules are respectively module 150, module 151, module 152, and module 153. Since the channel analyzer output bits $0_0$, $0_1$ are chained directly through all of the matrix modules, these output bits are presented as inputs $I_0$, $I_1$ to each of the matrix modules, regardless of position. Likewise, channel analyzer output binary bit $0_7$ is chained directly through all matrix modules, and is presented as input bit $I_7$ to all matrix modules, regardless of position. However, channel analyzer output bits $0_2$, $0_3$, $0_4$, $0_5$, and $0_6$ are sequentially manipulated by each of the matrix modules, and therefore the particular output bit value which is received as an input to each of the matrix modules is a function of the chained position of that matrix module with respect to the other matrix modules. For example, output bit $0_2$ is received only at input terminal $I_2$ of the first sequential-connected matrix module (150). Output bit $0_3$ is received as input $I_3$ to the first matrix module, but as input $I_2$ to the second-connected matrix module (151). Output bit $0_4$ is received as input bit $I_4$ of the first matrix module, $I_3$ of the second matrix module, and $I_2$ of the third-connected matrix module (152). Output bit $0_5$ is received as the $I_5$ input to the first matrix module, $I_4$ input to the second module, $I_3$ input to the third module, and $I_2$ input to the fourth-connected matrix module (153). Output bit $0_6$ is received as input bit $I_6$ to only the first-connected matrix module. Since all matrix modules are activated by the proper binary digit value on input terminal $I_2$, it is apparent that this activation input bit, i.e., "unit select," may be transmitted by the channel analyzer in output positions $0_2$, $0_3$, $0_4$ and $0_5$ for recognition by the respective sequentially-connected matrix modules. Since it is desirable to select only a single matrix module at any one time, some care must be used in planning the output binary value transmitted from channel analyzer 100. If matrix module 153 is to be selected, then output bit $0_5$ must be specially designated, and output bits $0_2$, $0_3$, $0_4$ must be designated to have the opposite value; if matrix module 152 is to be selected then output bit $0_4$ be specially designated, while output bits $0_3$ and $0_2$ must be designated to have the opposite value; if matrix module 151 is to be selected then output bit $0_3$ must be specially designated and output bit $0_2$ must be designated to have the opposite value; if matrix module 150 is to be selected then output bit $0_2$ must be specially designated. It can be seen that the channel analyzer count value set forth in Table 2 herein accomplishes all of the necessary conditions to permit activation of only a single matrix module at any one time.

TABLE 3

| Channel Analyzer Output | Module 150 Input | Module 151 Input | Module 152 Input | Module 153 Input |
|---|---|---|---|---|
| $0_0$ | $I_0$ | $I_0$ | $I_0$ | $I_0$ |

TABLE 3-continued

| Channel Analyzer Output | Module 150 Input | Module 151 Input | Module 152 Input | Module 153 Input |
|---|---|---|---|---|
| $0_1$ | $I_1$ | $I_1$ | $I_1$ | $I_1$ |
| $0_2$ | $I_2$ | | | |
| $0_3$ | $I_3$ | $I_2$ | | |
| $0_4$ | $I_4$ | $I_3$ | $I_2$ | |
| $0_5$ | $I_5$ | $I_4$ | $I_3$ | $I_2$ |
| $0_6$ | $I_6$ | | | |
| $0_7$ | $I_7$ | $I_7$ | $I_7$ | $I_7$ |

In operation, interconnection matrix modules are connected to respective computer channel conductors in the manner described herein, and are sequentially chained together in any order. The channel analyzer is programmed with the binary count values necessary for activation of the matrix modules which may be so connected, and the system is set into operation. Once activated, the channel analyzer will cause the respective matrix modules to selectively access the signal values found on the respective computer channel conductors, and will enable the passage of these signal values into the channel analyzer in a predetermined and sequential manner. The channel analyzer will perform its analysis functions as has been described in my copending application referred to herein, and analysis of computer channel signals may be accomplished.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for switching any of a plurality of data channels, each of said data channels comprising a plurality of signal lines, into a device for monitoring said signal lines, comprising
    (a) a plurality of modules, each module having an interconnection matrix and channel selection logic therein to permit switching of any of four data channels to a single data channel output;
    (b) means for connecting each of said modules to four data channels and means for connecting each of said four data channels' plurality of signal lines to said interconnection matrix;
    (c) means for connecting each of said modules' single data channel output to said device for monitoring said signal lines; and
    (d) means for connecting said plurality of modules in series connection with said device for monitoring said signal lines, wherein each of said modules further comprises module selection logic having means for selecting said module controlled by said modules' serial position relative to said device for monitoring.

2. The apparatus of claim 1, wherein said module selection logic further comprises means for receiving a first binary signal from said device for monitoring said signal lines; means for modifying said first binary signal and forming therefrom a second binary signal, and means for sending said second binary signal to a next subsequent module.

3. The apparatus of claim 2, wherein each said module selection logic further comprises decoding logic arranged to recognize a predetermined first binary selection signal and having means for activating said channel selection logic therein upon such recognition.

4. The apparatus of claim 3, wherein said decoding logic in all of the plurality of modules is arranged to recognize the same predetermined first binary selection signal.

5. A method of switching any of a plurality of data channels, each of said data channels comprising a plurality of signal lines, into a device for monitoring said signal lines, comprising the steps of
   (a) connecting all of said data channel signal lines into a plurality of interconnection switching matrices, arranged in modules comprising a switching matrix and signal lines for four channels in each module;
   (b) connecting the modules in series sequential relationship, wherein each module is adapted to receive a binary selection signal and to activate its switching matrix upon detection of a predetermined binary value, and adapted to modify the received binary signal and send the modified signal to the next subsequent module as a received binary signal; and
   (c) generating a binary selection signal and sending same to the first of said sequential, series-connected modules.

6. An apparatus for selecting any one of a plurality of series-connected devices, wherein all of said devices incorporate identical circuitry for sensing an input binary selection signal value and identical circuitry for transferring said signal to an output for series connection to the next subsequent device input, comprising (a) said circuitry for sensing an input binary selection signal value being responsive to signals in only predetermined binary positions of said input binary selection signal;
(b) said circuitry for transferring said signal to an output further comprising transformation circuits for transforming some, but not all, signal binary positions in a predetermined fashion, thereby transferring a binary signal value to said output which is different from the binary signal value received at said input; and comprising direct transfer circuits for directly transferring at least two binary signal values to said output in binary positions identical to said input binary positions; and comprising at least one transfer blocking circuit for blocking the signal received at at least one binary position input from transferring to said output; and
(c) means for transferring a predetermined binary selection signal to said first series-connected device input, the binary value of said predetermined binary selection signal being chosen to cause a predetermined device to become selected, taking into account the circuits for transforming signal binary positions and the at least one transfer blocking circuit.

7. The apparatus of claim 6, wherein said circuitry for sensing an input binary selection signal value further comprises an activation circuit connected to said at least one transfer blocking circuit, for sensing the binary signal values at the binary positions received by said at least one transfer blocking circuit.

* * * * *

UNITED STATES PATENT AND TRADEMARK OFFICE
CERTIFICATE OF CORRECTION

PATENT NO. : 4,978,953
DATED : December 18, 1990
INVENTOR(S) : Douglas Hauge

It is certified that error appears in the above-identified patent and that said Letters Patent is hereby corrected as shown below:

Column 5, line 43, "Light" should be -- eight --.

Column 9, line 1, "second" should be -- first --; after "position" insert -- , but not if it becomes cabled into a second chain position --.

Column 9, line 52, after "$0_4$" insert -- must --.

Signed and Sealed this

Twelfth Day of May, 1992

Attest:

DOUGLAS B. COMER

Attesting Officer     Acting Commissioner of Patents and Trademarks